(12) United States Patent
Choi et al.

(10) Patent No.: US 12,498,424 B2
(45) Date of Patent: Dec. 16, 2025

(54) METHOD FOR PREDICTING LIFESPAN CHARACTERISTICS OF LITHIUM SECONDARY BATTERY

(71) Applicants: LG ENERGY SOLUTION, LTD., Seoul (KR); GWANGJU INSTITUTE OF SCIENCE AND TECHNOLOGY, Gwangju (KR)

(72) Inventors: Dongin Choi, Daejeon (KR); Hyeong Jin Kim, Gwangju (KR); Wonhee Kim, Incheon (KR); Seok Koo Kim, Daejeon (KR)

(73) Assignees: LG ENERGY SOLUTION, LTD., Seoul (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 511 days.

(21) Appl. No.: 18/028,134

(22) PCT Filed: Mar. 29, 2022

(86) PCT No.: PCT/KR2022/004450
§ 371 (c)(1),
(2) Date: Mar. 23, 2023

(87) PCT Pub. No.: WO2022/239963
PCT Pub. Date: Nov. 17, 2022

(65) Prior Publication Data
US 2023/0324469 A1    Oct. 12, 2023

(30) Foreign Application Priority Data

May 12, 2021 (KR) .......... 10-2021-0061180
Mar. 25, 2022 (KR) .......... 10-2022-0037272

(51) Int. Cl.
*G01R 31/392* (2019.01)
*G01R 31/36* (2020.01)
(Continued)

(52) U.S. Cl.
CPC ....... *G01R 31/392* (2019.01); *G01R 31/3648* (2013.01); *G01R 31/367* (2019.01);
(Continued)

(58) Field of Classification Search
CPC ............... G01R 31/3648; G01R 31/367; G01R 31/378; G01R 31/385; G01R 31/389;
(Continued)

(56) References Cited

U.S. PATENT DOCUMENTS

| 2010/0312733 A1 | 12/2010 | Song et al. |
| 2011/0191278 A1 | 8/2011 | Song et al. |

(Continued)

FOREIGN PATENT DOCUMENTS

| CN | 108736057 A | 11/2018 |
| CN | 111766527 A | 10/2020 |

(Continued)

OTHER PUBLICATIONS

Nobuhiro Ogihara, Yuichi Itou, Tsuyoshi Sasaki, and Yoji Takeuchi (Impedance Spectroscopy Characterization of Porous Electrodes under Different Electrode Thickness Using a Symmetric Cell for High-Performance Lithium-Ion Batteries) The Journal of Physical Chemistry C 2015 119 (9), 4612-4619 (Year: 2015).*

(Continued)

*Primary Examiner* — Yoshihisa Ishizuka
(74) *Attorney, Agent, or Firm* — Morgan, Lewis & Bockius LLP

(57) ABSTRACT

Methods and systems may reliably predict the lifespan characteristics of a lithium secondary battery, for example, the mode of variation in cycle capacity in advance. A method (Continued)

may include a first step of subjecting a lithium secondary battery in a form of a blocking cell to an impedance spectroscopic analysis, a second step of deriving a relationship capacitance for each frequency and a calculating a charge amount, a third step of repeatedly performing the first and second steps, and a fourth step of measuring a capacity for each cycle of the lithium secondary battery and deriving a prediction expression of the capacity for each cycle of the lithium secondary battery.

14 Claims, 3 Drawing Sheets

(51) Int. Cl.
  *G01R 31/367* (2019.01)
  *G01R 31/378* (2019.01)
  *G01R 31/389* (2019.01)
  *H01M 10/0525* (2010.01)
  *H01M 10/42* (2006.01)
(52) U.S. Cl.
  CPC ......... *G01R 31/378* (2019.01); *G01R 31/389* (2019.01); *H01M 10/4285* (2013.01); *H01M 10/0525* (2013.01)
(58) Field of Classification Search
  CPC .... G01R 31/392; G06N 20/00; G06N 3/0499; G06N 3/08; G06N 3/09; H01M 10/052; H01M 10/0525; H01M 10/42; H01M 10/4285; H01M 10/44; H01M 10/48; H01M 2010/4271; Y02E 60/10
  See application file for complete search history.

(56) References Cited

U.S. PATENT DOCUMENTS

| | | | |
|---|---|---|---|
| 2012/0019253 | A1 | 1/2012 | Ziegler et al. |
| 2018/0306868 | A1 | 10/2018 | Kim et al. |
| 2020/0028208 | A1 | 1/2020 | Dasgupta et al. |
| 2020/0200825 | A1 | 6/2020 | Izumi et al. |
| 2021/0226190 | A1 | 7/2021 | Park |
| 2022/0182014 | A1* | 6/2022 | Olayiwola ............. H02S 50/10 |

FOREIGN PATENT DOCUMENTS

| | | | |
|---|---|---|---|
| JP | 2012-122817 | A | 6/2012 |
| JP | 2014-044149 | A | 3/2014 |
| JP | 5896230 | B2 | 3/2016 |
| JP | 2016-225184 | A | 12/2016 |
| JP | 2020-101400 | A | 7/2020 |
| KR | 10-2009-0020448 | A | 2/2009 |
| KR | 10-2011-0124204 | A | 11/2011 |
| KR | 10-2017-0107738 | A | 9/2017 |
| KR | 10-1792975 | B1 | 11/2017 |
| KR | 10-1949449 | B1 | 2/2019 |
| KR | 10-1958306 | B1 | 3/2019 |
| KR | 10-1982120 | B1 | 5/2019 |
| KR | 10-2020-0002013 | A | 1/2020 |
| KR | 10-2106775 | B1 | 5/2020 |
| KR | 10-2156866 | B1 | 9/2020 |
| KR | 10-2020-0119383 | A | 10/2020 |
| WO | 2020/178623 | A1 | 9/2020 |

OTHER PUBLICATIONS

Extended European Search Report issued Mar. 7, 2024 for European Patent Application No. 22807611.3.
International Search Report issued Jul. 7, 2022 with Written Opinion in the corresponding International Patent Application No. PCT/KR2022/004450.
Li et al., "State-of-health prediction for lithium-ion batteries via electrochemical impedance spectroscopy and artificial neural networks", Energy Storage, (2020).
Kwon et al., "Remaining-useful-life prediction via multiple linear regression and recurrent neural network reflecting degradation information of 20Ah LiNixMnyCo1-x-yO2 pouch cell", Journal of Electroanalytical Chemistry, Elsevier, (2019).
Taberna et al., "Electrochemical characteristics and impedance spectroscopy studies of carbon-carbon supercapacitors," Journal of the Electrochemical Society, vol. 150, Issue 3, (2003) pp. A292-A300.
Ogihara et al., "Ion Transport in Porous Electrodes Obtained by Impedance Using a Symmetric Cell with Predictable Low-Temperature Battery Performance", Journal of the Physical Chemistry Letters, vol. 10, (2019) pp. 5013-5018.
Jang et al., "Complex Capacitance Analysis of Impedance Data and its Applications", Journal of the Korean Electrochemical Society, vol. 13, No. 4, (2010) pp. 223-234.
Cha et al., "Boosting Reaction Homogeneity in High-Energy Lithium-Ion Battery Cathode Materials" Advanced Materials, vol. 2003040, (2020) pp. 1-10.

* cited by examiner

[FIG. 1]
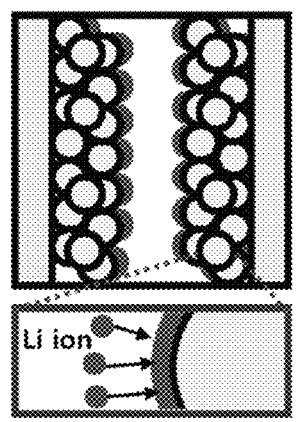
[FIG. 2]
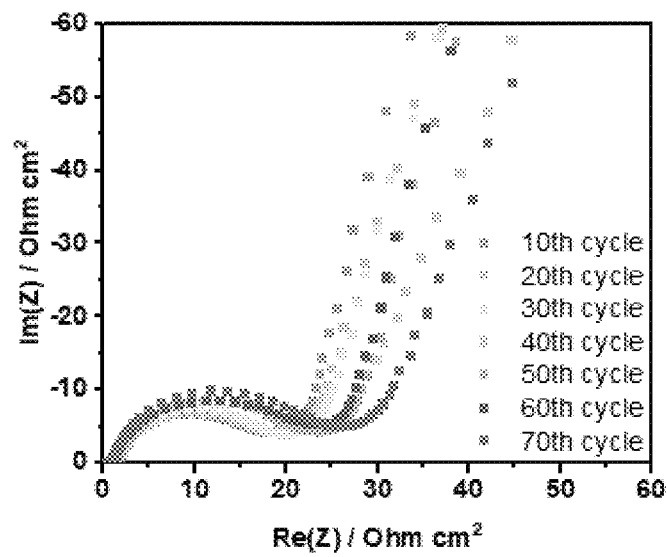

[FIG. 3a]
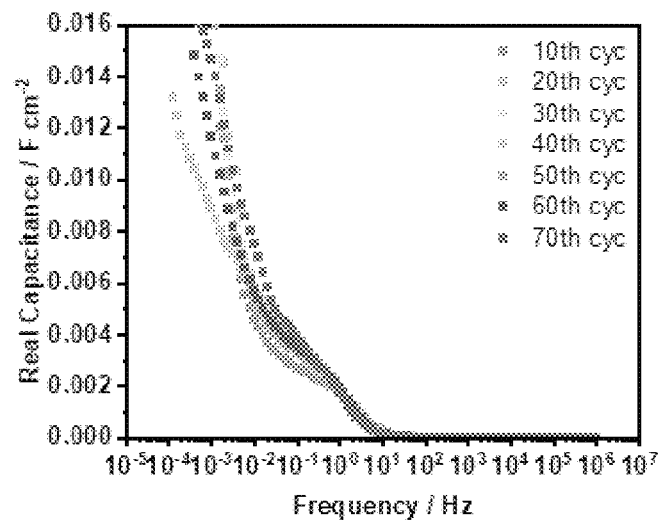
[FIG. 3b]
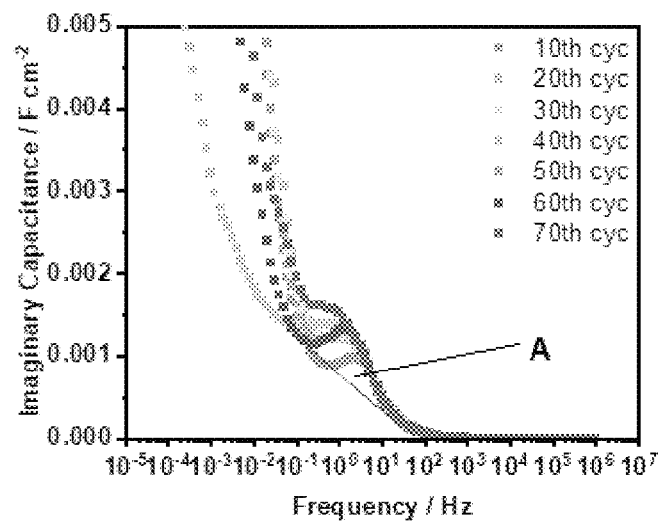

[FIG. 4]
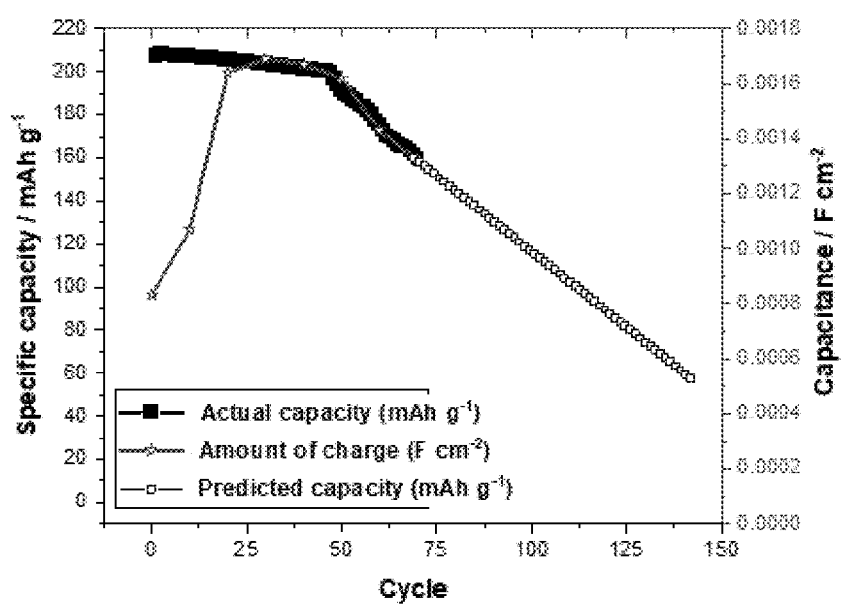

METHOD FOR PREDICTING LIFESPAN CHARACTERISTICS OF LITHIUM SECONDARY BATTERY

CROSS CITATION WITH RELATED APPLICATION(S)

This application claims the benefit of Korean Patent Application No. 10-2021-0061180 filed on May 12, 2021 and Korean Patent Application No. 10-2022-0037272 filed on Mar. 25, 2022 with the Korean Intellectual Property Office, the entire content of both of which is incorporated herein by reference.

TECHNICAL FIELD

The present disclosure relates to a method for predicting lifespan characteristics of a lithium secondary battery that can reliably predict the lifespan characteristics of a lithium secondary battery, specifically, the change pattern of capacity for each cycle in advance.

BACKGROUND

Recently, in order to deal with air pollution or greenhouse gas generation, and global warming, interest in the utilization of new renewable energy has increased significantly. For the smooth utilization of such new renewable energy, the development of efficient energy storage technology must be preceded, and lithium secondary batteries such as lithium ion batteries having a high energy density relative to weight has attracted the most attention as a representative energy storage technology.

Particularly, in the automobile industry, there are high expectations for the reduction of carbon dioxide emissions due to the introduction of electric vehicles (EV) and hybrid electric vehicles (HEV). For their practical utilization, the development and commercialization of medium or large-sized lithium secondary batteries has actively proceeded.

For these medium or large-sized lithium secondary batteries, lifespan characteristics that maintain excellent capacity over long periods of time are essentially required along with high capacity, energy density, and output characteristics. Accordingly, in the development process of the lithium secondary battery, research has essentially proceeded to improve the capacity characteristics and lifespan characteristics through research and design of various electrode materials and structures, selection of electrolytes, and battery structures.

By the way, in the case of the lifespan characteristics of the lithium secondary battery, these are affected by vary various factors, including the material and structure of the electrode, the type of electrolyte, and the overall battery structure and material combination, and there is a disadvantage in that it is difficult to grasp in advance the extent to which each element affects the lifespan characteristics.

Therefore, in the conventional research and development process for lithium secondary batteries, there is a disadvantage in that it is difficult to predict lifespan characteristics of the battery without actually manufacturing the battery. As a result, there is a disadvantage in that there is no choice but to go through many trials and errors, including actual battery production and long-term testing, in order to develop a battery having long lifespan characteristics.

Due to these disadvantages, in order to further shorten the research and development process of lithium secondary batteries having excellent lifespan characteristics, there has been a continuous demand for the development of a method that can reliably and easily predict lifespan characteristics of lithium secondary batteries in advance, even through basic information about the battery.

DETAILED DESCRIPTION OF THE INVENTION

Technical Problem

It is an object of the present disclosure to provide a method for predicting lifespan characteristics of a lithium secondary battery that can reliably predict its lifespan characteristics, specifically, the change pattern of capacity for each cycle in advance, even through basic design information about the lithium secondary battery.

Technical Solution

According to one aspect of the present disclosure, there is provided a method for predicting lifespan characteristics of a lithium secondary battery, the method comprising:
- a first step of subjecting a lithium secondary battery in a form of a blocking cell to an impedance spectroscopic analysis under application of multiple frequencies;
- a second step of deriving a relationship between capacitance ($F/cm^2$) for each frequency (Hz) from the impedance spectroscopic analysis result, and calculating the charge amount ($F/cm^2$) of the lithium secondary battery therefrom;
- a third step of repeatedly performing the first and second steps while repeatedly performing the electrochemical reaction for the lithium secondary battery for x cycles, to thereby collect charge amount ($F/cm^2$) data of the lithium secondary battery for each x cycle; and
- a fourth step of measuring the capacity y (mAh/g) for each x cycle for a lithium secondary battery in a form of a non-blocking cell, and allowing it to correspond to the charge amount ($F/cm^2$) data for each x cycle collected in the third step, to thereby derive a prediction expression of the capacity for each cycle of the lithium secondary battery.

According to another aspect of the present disclosure, there is provided a system for predicting lifespan characteristics of a lithium secondary battery, the system comprising:
- a first measurement unit including an impedance spectroscopic analysis device;
- a second measurement unit that measures the capacity for each cycle while subjecting a lithium secondary battery in a form of a non-block cell to an electrochemical reaction;
- a data processing unit that calculates a charge amount ($F/cm^2$) and a charge amount for each cycle from the impedance spectroscopic analysis result data of the lithium secondary battery in a form of a blocking cell derived from the first measurement unit; and
- a calculation unit that derives a prediction expression of the capacity for each cycle of a lithium secondary battery, from the capacity data for each cycle of the lithium secondary battery in a form of non-blocking cell that is inputted from the second measurement unit and the charge amount data for each cycle of the lithium secondary battery in a form of blocking cell that is inputted from the data processing unit.

Now, the method and system for predicting lifespan characteristics of a lithium secondary battery according to an embodiment of the present disclosure will be described in more detail.

According to one embodiment of the disclosure, there is provided a method for predicting lifespan characteristics of a lithium secondary battery, the method comprising:
- a first step of subjecting a lithium secondary battery in a form of a blocking cell to an impedance spectroscopic analysis under application of multiple frequencies;
- a second step of deriving a relationship between capacitance ($F/cm^2$) for each frequency (Hz) from the impedance spectroscopic analysis result, and calculating the charge amount ($F/cm^2$) of the lithium secondary battery therefrom;
- a third step of repeatedly performing the first and second steps while repeatedly performing the electrochemical reaction for the lithium secondary battery for x cycles, to thereby collect charge amount ($F/cm^2$) data of the lithium secondary battery for each x cycle; and
- a fourth step of measuring the capacity y (mAh/g) for each x cycle for a lithium secondary battery in a form of a non-blocking cell, and allowing it to correspond to the charge amount ($F/cm^2$) data for each x cycle collected in the third step, to thereby derive a prediction expression of the capacity for each cycle of the lithium secondary battery.

The prediction method of one embodiment may further include a fifth step of performing artificial neural network learning based on the impedance spectroscopic analysis result to correct a prediction expression of the fourth step, and then, may further comprise a sixth step of predicting capacity characteristics for each cycle of the lithium secondary battery to be measured, based on the prediction expression of the fourth step or the corrected prediction expression of the fifth step.

The present inventors have continued research to develop a method for reliably predicting the lifespan characteristics of a lithium secondary battery in the process of basic research and development. Based on the result of this research, the inventors have performed impedance spectroscopic analysis for a lithium secondary battery in a form of a blocking cell that reflects basic battery elements such as electrode materials and structures and electrolyte materials, and as a result, found that by utilizing the data, it is possible to reliably predict the lifespan characteristics of the lithium secondary battery to be manufactured, and more specifically, the change pattern of capacity for each cycle, and completed the invention. Furthermore, by further correcting the prediction expression of the lifespan characteristics through artificial neural network learning, the lifespan characteristics of the lithium secondary battery can be more reliably predicted in advance.

More specifically, the present inventors have noted to the fact that the diffusion and mobility of lithium ions occurring on each electrode via the electrolyte inside the lithium secondary battery fundamentally affect the performance of the lithium secondary battery, particularly the lifespan characteristic. Thereby, an attempt was performed to predict lifespan characteristics of a lithium secondary battery in advance by applying a battery in a form a blocking cell that can selectively check and analyze the degree of diffusion and adsorption of lithium ions on the electrode.

Meanwhile, electrochemical impedance spectroscopy (EIS) is an analysis technique that can analyze various electrochemical reactions for each frequency by applying an alternating current to the battery, and various electrochemical properties of cells can be evaluated over a wide frequency range and a wide range of time. Furthermore, since this impedance spectroscopy utilizes an alternating current signal with a relatively small amplitude (e.g., about 5 to 10 mV), it is known that not only it can evaluate various electrochemical characteristics of a battery while reducing damage to the electrode, but also it is less affected by noise and thus the electrochemical characteristics of the battery can be evaluated with high precision.

When the electrochemical characteristics of the lithium secondary battery in a form of a blocking cell are analyzed by such impedance spectroscopy, it is possible to obtain data related to various resistance components of the battery depending on the type and structure of the electrolyte and electrode, such as various resistance components including real and imaginary impedance for each frequency, and various electrochemical characteristics such as imaginary and real capacity data for each frequency.

The present inventors have confirmed that from the electrochemical data obtained by performing impedance spectroscopic analysis of the lithium secondary battery in a form of a blocking cell in this way, it is possible to obtain relation data of capacitance ($F/cm^2$) for each frequency (Hz), specifically, relation data of the imaginary capacitance for each frequency, which are closely related to the amount of lithium ions stored along the electrode surface, and can evaluate the degree of diffusion/adsorption of lithium ions.

The charge amount ($F/cm^2$) of the lithium secondary battery in a form of a blocking cell can be calculated by utilizing the relation data of the imaginary capacitance for each frequency, and the charge amount data for each cycle of the lithium secondary battery can be calculated by repeating this process while performing the electrochemical reaction cycle of the lithium secondary battery. Separately from this, the capacity data for each cycle separately measured for a general lithium secondary battery, that is, a lithium secondary battery in a form of a non-blocking cell, was made to correspond to the charge amount data for each cycle to thereby infer the change pattern of the electrode structure and the degree of cell degradation for each cycle, while it is possible to obtain prediction data on how the capacity changes for each cycle in an actual lithium secondary battery.

By utilizing the predicted data of the capacity for each cycle, a relation expression of the capacity y for each x cycle can be derived, which can be used as a prediction expression of the capacity of each cycle of the lithium secondary battery. In addition, as the artificial neural network learning is performed by feeding back additional electrochemical data obtained as the impedance spectroscopic analysis result, the prediction expression of the capacity for each cycle may be corrected and the reliability thereof can be further improved.

As a result, it was confirmed that by applying the prediction expression of the capacity for each cycle derived through this process, the lifespan characteristics, particularly, the change pattern of the capacity for each cycle for the actual lithium secondary battery comprising the same kind of electrolyte and/or electrode as the battery in a form of a blocking cell can be predicted in advance with very high reliability.

Therefore, if the prediction method of one embodiment is utilized, the long-term lifespan characteristics of the lithium secondary battery can be predicted in advance with very high reliability by utilizing the basic battery design elements, without actually manufacturing a lithium secondary battery and performing long-term lifespan characteristic testing. As a result, many trials and errors can be reduced in the research and development process of the lithium secondary battery, and the research and development process of the battery can be greatly shortened.

The prediction method of such one embodiment will be described in more detail for each step.

In the method of one embodiment, first, the lithium secondary battery in a form of a blocking cell is subjected to an impedance spectroscopic analysis under application of multiple frequencies (first step).

At this time, the lithium secondary battery in a form of a blocking cell to be analyzed includes an electrode (e.g., cathode and/or anode) facing each other similarly to an actual battery, and a separator and an electrolyte therebetween, but refers to a battery form in which an electrochemical reaction between electrodes, such as oxidation or reduction reaction or lithium intercalation/deintercalation reaction, which is referred to as a faradaic reaction, does not occur inside the battery.

When the lithium secondary battery in a form of a blocking cell is subjected to an impedance spectroscopic analysis under the application of a low-frequency AC signal, only diffusion and adsorption reactions of lithium ions occur along the electrode surface in the inside of the battery in the form of a blocking cell as shown in FIG. 1, such lithium ions are stored along the electrode surface. Therefore, by the impedance spectroscopic analysis of the lithium secondary battery in a form of a blocking cell, capacitance is measured for each cycle, the charge amount characteristic is analyzed more reliably, and the lifespan characteristics of the lithium secondary battery can be predicted with very high reliability.

The lithium secondary battery in a form of a blocking cell includes electrodes with the same polarity as electrodes facing each other (e.g., including only cathodes that face each other) in order to prevent an electrochemical reaction between the electrodes, or such an electrode includes a blocking electrode, or can be manufactured in a form including a blocking electrolyte.

In a specific example, the blocking electrode may be in the form of a pristine electrode in which electrochemical activation is not performed, or an electrode in which the SOC is controlled to 0 or 100%, so as to prevent the progress of lithium intercalation/deintercalation reaction between electrodes after battery manufacture.

Further, another example of the battery in a form of block cell can be manufactured so as to include a blocking electrolyte such as non-intercalation salt as the electrolyte. The non-intercalation salt refers to a salt form in which the size of the cation contained therein is larger than the interlayer distance of the electrode active material (e.g., lithium transition metal oxide or graphite, etc.), which can thus suppress the electrochemical reaction between the electrodes such as lithium intercalation/deintercalation reaction between the electrodes. More specific examples of such non-intercalation salt may include tetrabutylammonium perchlorate, tetrabutylammonium fluoride, tetrabutylammonium hydrogen sulfate, malondialdehyde tetrabutylammonium, or the like, and additionally, various salts having large cations can be used.

Meanwhile, the lithium secondary battery in a form of a blocking cell can be manufactured using the same materials and methods as a general battery except for including the above-mentioned blocking electrode or electrolyte, and can reflect the same kind of electrode material, electrode structure and/or electrolyte material as the battery to be actually researched and developed.

The lithium secondary battery in a form of a blocking cell can be analyzed using general impedance spectroscopy device that has been used for electrochemical characterization of batteries before, and for example, impedance spectroscopic analysis can be performed under the application of an alternating current signal having an amplitude of about 5 to 10 mV and a frequency of $10^6$ to $10^{-4}$ Hz.

Particularly, in the prediction method of one embodiment, as the impedance spectroscopic analysis proceeds under a low frequency of $10^6$ to $10^{-4}$ Hz, the reliability of lifespan prediction of a lithium secondary battery can be significantly improved.

When a general lithium secondary battery is subjected to an impedance spectroscopic analysis in the low frequency region, electrochemical reactions such as intercalation/deintercalation of lithium ions between electrodes occur within the battery. However, if the battery in a form of a blocking cell is subjected to an impedance spectroscopic analysis in the low frequency region, diffusion and adsorption of lithium ions mainly occur on the electrode as described above, and the corresponding lithium ions can be stored along the electrode surface. That is, As a result of impedance spectroscopic analysis under low frequency for the blocking cell type battery, the amount of charge stored along the surface of the electrode can be calculated. Thus, in consideration of this point, a prediction expression of the charge amount data for each cycle and the capacity for each cycle is derived, and the lifespan characteristics of lithium secondary batteries can be predicted with high reliability.

By the way, during the impedance spectroscopic analysis, diffusion and adsorption of lithium ions occur in the low frequency region, and in the ultra-low frequency range, which is lower than this, side reactions between the electrodes and the electrolyte may occur, which results in the generation of leakage current. By the way, depending on the reactivity of the electrode, a frequency region in which diffusion and adsorption of lithium ions occur may partially overlap with a frequency region in which leakage current occurs. In this case, the amount of charge stored on the electrode surface cannot be properly analyzed and calculated, or a side reaction may occur on the electrode surface to damage the electrode contained in the battery in a form of a blocking cell. As a result, from the impedance spectroscopic analysis result, the charge amount and capacity characteristics for each cycle of the battery cannot be reliably calculated, so that the reliability of the prediction method according to the one embodiment can be significantly reduced.

Unlike the same, in one embodiment method, the impedance spectroscopic analysis is performed under the application of a frequency of $10^6$ to $10^{-4}$ Hz. The capacitance extracted in this analysis process is divided into a leakage current and an absorbed charge, so that the charge stored along the electrode surface inside the lithium secondary battery in a form of a blocking cell can be reliably analyzed and confirmed. As a result, the charge amount and capacity characteristics for each cycle of the battery are reliably calculated, so that the accuracy and reliability of the prediction method of the one embodiment can be significantly improved.

Meanwhile, as described above, when impedance spectroscopic analysis is performed for a lithium secondary battery in a form of a blocking cell, a Nyquist plot of the lithium secondary battery can be derived as a direct result thereof, and from this, data related to various electrochemical properties of the lithium secondary battery, such as real capacitance data, imaginary capacitance data, time constant data, capacitance relation graph for each frequency and its peak distribution data can be further calculated.

For reference, in FIG. 2, an example of a Nyquist plot directly derived as a result of the impedance spectroscopic analysis is shown. As shown in FIG. 2, the Nyquist plot can be derived as relation data of a real impedance (x-axis, $\Omega^*cm^2$) and an imaginary impedance (y-axis, $\Omega^*cm^2$) for each frequency (Hz) applied during the impedance spectroscopic analysis. Further, due to the difference in the occurrence of electrochemical reactions such as intercalation/deintercalation of lithium between electrodes, the Nyquist plot of a lithium secondary battery in a form of a blocking cell appears in a form different from that of a general lithium secondary battery (non-blocking cell).

From the Nyquist plot for the battery in a form of a blocking cell, real impedance ($\Omega^*cm^2$) and imaginary impedance ($\Omega^*cm^2$) for each frequency (Hz) can be derived, respectively, and the total complex impedance can be calculated from the real and imaginary impedances.

Therefore, in the prediction method of one embodiment, a relationship between capacitance (F/cm²) for each frequency (Hz) is derived from the impedance spectroscopic analysis result, and the charge amount (F/cm²) of the lithium secondary battery can be calculated therefrom (second step).

More specifically, the real impedance ($\Omega^*cm^2$), imaginary impedance ($\Omega^*cm^2$) and complex impedance ($\Omega^*cm^2$) for each frequency (Hz) derived from the Nyquist plot are substituted into the following Equation 1, and a real capacitance (F/cm²) and an imaginary capacitance (F/cm²) for each frequency can be derived, respectively. For reference, the method of deriving real and imaginary capacitances for each frequency from the Nyquist plot are specifically described in "P. L. Taberna et al., Journal of The Electrochemical Society, 150 (3) A292-A300 (2003)" or "Nobuhiro Ogihara et al., J. Phys. Chem. Lett. 2019, 10, 5013-5018", and the like.

$$C' = \frac{-Z''(\omega)}{\omega|Z(\omega)|^2} \quad C'' = \frac{-Z'(\omega)}{\omega|Z(\omega)|^2} \qquad \text{[Equation 1]}$$

in the above Equation 1, C' represents the real capacitance (F/cm²) of the lithium secondary battery, C" represents the imaginary capacitance (F/cm²), w represents the angular velocity defined as $2*\pi*$frequency, z'(w) represents the real impedance ($\Omega^*cm^2$) for each angular velocity, z"(w) represents the imaginary impedance ($\Omega^*cm^2$) for each angular velocity, and z(w) represents the total complex impedance ($\Omega^*cm^2$) calculated from the real impedance and the imaginary impedance.

That is, the Nyquist plot derived from the above-mentioned impedance spectroscopic analysis, the result of derivation of imaginary impedance, real impedance and complex impedance for each frequency, the relationship between the capacitance for each frequency of the lithium secondary battery from Equation 1, more specifically, a relation graph between real and imaginary capacitances (F/cm²) for each frequency (Hz) can be derived, respectively, and one example of these are shown in FIGS. 3a and 3b, respectively.

Among them, the relation graph of the imaginary capacitance (F/cm²) for each frequency (Hz) of the lithium secondary battery can be derived in the form of a single distribution curve having a single peak, as exemplarily shown in FIG. 3b. The relation graph of the imaginary capacitance for each frequency can represent the amount of energy lost during the irreversible process, and can correspond to the amount of lithium ions stored along the electrode surface in the battery in a form of a blocking cell. Therefore, the charge amount of the lithium secondary battery can be calculated from the relation graph of the imaginary capacitance for each frequency.

Specifically, as shown in FIG. 3b, if a baseline (red line in FIG. 3b) is set in the graph of the single distribution curve form, and then the area under the peak (A) of this single distribution curve is integrated, the charge amount (F/cm²) of the lithium secondary battery can be calculated from the well-known relation expression between area and charge, specifically, area (A)=0.682*charge amount Co (see "Jong Hyun Jang et al, Journal of the Korean Electrochemical Society, 13, 4, 2010, 223-234"), and the structural characteristics within the electrode, such as the electrochemically active area of the electrode, can be predicted from the calculated value of the amount of charge.

In addition to the charge amount of the battery, in the relation graph of the imaginary capacitance for each frequency in the form of a single distribution curve, the time constant and output of the lithium secondary battery can be calculated by taking the frequency value of the x-axis corresponding to the peak point as the reciprocal. In addition, it is possible to calculate the peak distribution ($\sigma$) of the relation graph of the imaginary capacitance for each frequency, which can reflect the structural uniformity of the electrode.

Meanwhile, as shown in FIGS. 2, 3a and 3b, in the prediction method of one embodiment, while repeating the electrochemical reaction for x cycles of the lithium secondary battery in the form of a blocking cell to be analyzed, the process of deriving various electrochemical characteristic data such as the above-mentioned impedance spectroscopic analysis for each regular cycle, the calculation of the amount of charge (F/cm²) of the battery, and the peak distribution of the relation graph of the capacitance by time constant, output, and frequency of other batteries can be repeatedly performed (third step).

Through such repetitively performing processes, charge amount data for each x cycle can be collected for the lithium secondary battery in a form of a blocking cell. In addition, separately from the charge amount data for each cycle, the capacity data for each cycle separately measured for a general lithium secondary battery in a form of a non-blocking cell and not a blocking cell, that is, a lithium secondary battery in a form of a non-blocking cell is made to correspond to the collected charge amount data for each cycle (see FIG. 4). From the result of the correspondence between these data, the change pattern of the electrode structure (e.g., the electrochemical active area of the electrode, etc.) for each cycle and the degree of degradation of the cell are inferred, while it is possible to secure/collect prediction data on how the capacity y (mAh/g) changes for each x cycle in the lithium secondary battery.

When linear regression is performed on the prediction data of capacity y for each x cycle collected by such a method, the prediction expression of the capacity for each cycle of the lithium secondary battery may be derived in the form of, for example, y=ax+b (a and b are constants determined by linear regression) (fourth step).

In such a linear regression process, the prediction expression of the capacity for each cycle can be derived from a relation expression of the capacity y for each x cycle after the electrochemical reaction proceeded for 30 cycles or more, for example, 30 to 200 cycles, or 40 to 100 cycles for the lithium secondary battery in a form of a blocking cell.

For reference, the initial 30 cycles are the stabilization cycles of the battery, and it was confirmed that the capacity calculated from the data of these initial 30 cycles reflects not only the result of the electrochemical reaction on the electrode (storage according to lithium ion diffusion and adsorption) but also the capacity generated during formation of solid-electrolyte interface (SEI). Therefore, it was confirmed that as the prediction expression of the capacity for each cycle is derived based on the data after 30 cycles, the lifespan characteristics of the lithium secondary battery can be predicted more reliably.

Meanwhile, in the method of one embodiment, the lifespan characteristics of a lithium secondary battery can be predicted by utilizing the prediction expression of the capacity for each cycle derived through the above process, but an additional correction step may be further performed to further improve its reliability. For this purpose, the method of one embodiment may further include a fifth step of correcting the prediction expression of the capacity for each cycle derived in the fourth step by performing the artificial neural network learning, based on the results of impedance spectroscopic analysis performed in the same manner as described above for a plurality of lithium secondary batteries in the form of block cells that are identical or equivalent to the batteries that have undergone the first to third steps.

At this time, the step of deriving the prediction expression by data correspondence of the fourth step and the artificial neural network learning step of the fifth step can be sequentially performed, but each of these steps may be performed simultaneously or within the same system. Furthermore, the calculation of the prediction expression of the capacity for each cycle and the correction by artificial neural network learning can be simultaneously performed in the same system.

Meanwhile, the artificial neural network learning process can be performed by a method of feedback based on data, including electrochemical property data derived from the impedance spectroscopic analysis result, for example, real and imaginary capacitance data of a battery, time constant data, peak distribution data of a capacitance relation graph for each frequency. Through this, the reliability can be improved by correcting the prediction expression of the capacity for each cycle in the fourth step.

The type and structure of the artificial neural network system that can be applied in the process of learning and correction are not particularly limited, and any artificial neural network system that has been previously applied for evaluating and predicting battery characteristics can be applied. Examples of such artificial neural network systems are readily known to those skilled in the art through "Li Y, Dong B, Zerrin T, et al. State-of-health prediction for lithium-ion batteries via electrochemical impedance spectroscopy and artificial neural networks. Energy Storage. 2020; e186" and "Soon-Jong Kwon et al, Journal of Electroanalytical Chemistry 858 (2020) 113729", etc.

Meanwhile, specific examples of advancing the artificial neural network learning will be described as follows.

It is known that the lifespan characteristics of a lithium secondary battery can be evaluated through various characteristics such as, for example, the residual capacity per cycle or rate-limiting characteristics. And it is known that these characteristics are affected by changes in the electrode structure due to the formation of the SEI layer on the electrode surface, chemical changes of the electrode active material, and the like.

Among them, the rate-limiting characteristic corresponds to the time constant data of the battery that can be derived from the above-mentioned impedance spectroscopic analysis result, which is related to the charging speed of the battery. For example, in the case of a battery with a short time constant and good rate-limiting characteristics, sufficient capacity can be expressed under the same conditions of charging, and conversely, in the case of a battery with a long time constant and poor rate-limiting characteristics, it may be difficult to exhibit a sufficient capacity under the same conditions of charging.

Therefore, in the artificial neural network learning process according to one embodiment, the patterns of rate-limiting characteristics of each battery, changes in the electrode structure resulting therefrom, and lifespan characteristics (capacity characteristics for each cycle) can be predicted by utilizing the time constant data for a plurality of batteries in the form of blocking cells.

In other words, by utilizing the time constant data derived from the impedance spectroscopic analysis result as described above, the rate-limiting characteristic and electrode structure change according to the cycle and the change in capacity are predicted and fed back, and based on the feedback result, the prediction expression of the capacity for each cycle derived in the fourth step can be corrected.

In addition, it is known that the peak distribution ($\sigma$) of the relation graph of the capacitance for each frequency that can be derived from the above-mentioned impedance spectroscopic analysis process is related to the uniformity of the electrode structure, for example, the pore structure in the electrode.

Therefore, in the artificial neural network learning process according to another embodiment, by utilizing the peak distribution data of the relation graph of capacitance for each frequency, the change pattern in the electrode pore structure and electrode structure uniformity for each cycle is predicted and fed back, and based on the feedback result, the prediction expression of the capacity for each cycle derived in the fourth step can be corrected.

In this manner, when various electrochemical characteristic data derived from the impedance spectroscopic analysis process, for example, data related to the change pattern of the electrode structure for each cycle, are fed back and subjected to artificial neural network learning, the data according to the change mode of the electrode structure are considered together in the prediction expression of the capacity for each cycle from the result of charge amount calculation for each cycle, and can be finally derived in a state in which the reliability is greatly improved.

By utilizing the prediction expression of the capacity for each cycle finally derived as described above, it is possible to predict the cycle capacity characteristics of the measurement target lithium secondary battery to be actually manufactured (sixth step). For example, if the above-mentioned prediction expression in the form of a linear function is used, it is possible to predict with great certainty what capacity an actual lithium secondary battery containing electrodes and/ or electrolytes of the same kind as a battery in the form of blocked cells exhibits for each cycle.

The graph of the calculation result of the charge amount for each cycle (red) and the prediction expression graph of the capacity for each cycle (blue) for the battery in a form of a blocking cell derived from the prediction method of one embodiment described above, and the graph of actual lithium secondary battery capacity for each cycle (black) are shown together in FIG. 4. Referring to FIG. 4, it is confirmed that the prediction expression of the capacity for each cycle derived from the prediction method of one embodiment can predict the actual measurement result with very high reliability.

Meanwhile, according to another embodiment of the present disclosure, there is provided a system for predicting lifespan characteristics of a lithium secondary battery that performs the prediction method of one embodiment described above. The prediction system of such other embodiments may include, for example, a first measurement unit including an impedance spectroscopic analysis device; a second measurement unit that measures the capacity for each cycle while performing an electrochemical reaction on a lithium secondary battery in the form of a non-block cell; a data processing unit that calculates a charge amount (F/cm$^2$) and a charge amount for each cycle from the impedance spectroscopic analysis result data of the lithium secondary battery in the form of a blocking cell derived from the first measurement unit; and a calculation unit that derives a capacity prediction expression for each cycle of a lithium secondary battery, from the capacity data for each cycle of the lithium secondary battery in a form of a non-blocking cell that is inputted from the second measurement unit and the charge amount data for each cycle of the lithium secondary battery in a form of a blocking cell that is inputted from the data processing unit.

In the prediction system of the other embodiment, the data processing unit may calculate the charge amount for each cycle, from the relation data of the imaginary capacitance (F/cm$^2$) for each frequency (Hz) included in the impedance spectroscopic analysis result data.

In the prediction system of such other embodiment, in the first measurement unit, a part of the first step of subjecting the lithium secondary battery in a form of a blocking cell to an impedance spectroscopic analysis under the application of multiple frequencies and the third step of repeatedly performing the above impedance spectroscopic analysis for each cycle can be performed.

In addition, in the data processing unit, a part of the second step and the third step of deriving the relationship between the capacitance (F/cm$^2$) for each frequency (Hz) from the impedance spectroscopic analysis result data, calculating the charge amount (F/cm$^2$) of the lithium secondary battery therefrom and repeatedly performing this process for each cycle to calculate the charge amount for each cycle can be performed.

Further, in the second measurement unit, the capacity for each cycle can be measured while performing an electrochemical reaction for the lithium secondary battery in a form of a non-blocking cell.

And, in the calculation unit, the fourth step of deriving the prediction expression of the capacity for each cycle of the lithium secondary battery by mutually corresponding the capacity data for each cycle of the lithium secondary battery in a form of a non-blocking cell that is inputted from the second measurement unit and the charge amount data for each cycle of the lithium secondary battery in a form of a blocking cell that is inputted from the data processing unit.

In addition, the prediction system of the other embodiment may further include an artificial neural network learning unit that performs artificial neural network learning based on the impedance spectroscopic analysis result data that is inputted from the first measurement unit, and corrects the capacity prediction expression for each cycle derived from the calculation unit. The artificial neural network learning unit may be separated, or integrated with the calculating unit. When the artificial neural network learning unit and the calculating unit are integrated into a single system, the process of deriving the prediction expression of the fourth step and the process of correcting the prediction expression by artificial neural network learning of the fifth step may be performed simultaneously.

As described above, by utilizing the prediction system of another embodiment, the method of predicting lifespan characteristics of the lithium secondary battery of one embodiment can be performed, whereby lifespan characteristics including change pattern of the capacity for each cycle of the lithium secondary battery can be reliably predicted.

However, the first and second measurement units included in the prediction system of another embodiment may have a configuration of a general impedance spectroscopy device and a capacity measurement device of a lithium secondary battery, and the data processing unit and the calculating unit (artificial neural network learning unit) may also have a configuration of a general artificial neural network learning system.

In addition, with respect to the specific method of the first to fifth steps carried out in each part of the prediction system, since the method of one embodiment has already been described above, a further description thereof will be omitted.

Advantageous Effects

As described above, according to the present disclosure, the long-term lifespan characteristics of the lithium secondary battery, specifically, the change pattern of the capacity for each cycle can be predicted in advance with very high reliability by utilizing basic battery design elements, without actually manufacturing a lithium secondary battery and performing its long-term lifespan testing, Therefore, when applying the prediction method and prediction system of the present disclosure, it is possible to reduce many trials and errors in the research and development process of lithium secondary batteries, and significantly shorten the research and development process of batteries.

BRIEF DESCRIPTION OF THE DRAWINGS

FIG. 1 is a diagram schematically showing diffusion and adsorption reactions of lithium ions that occur during impedance spectroscopic analysis inside a lithium secondary battery in a form of a blocking cell used in a prediction method according to an embodiment of the present disclosure.

FIG. 2 is a diagram showing an example of a Nyquist plot derived as a result of impedance spectroscopy in a prediction method according to an embodiment of the present disclosure.

FIG. 3a is a diagram showing an example of a relation graph of real capacitance (F/cm$^2$) for each frequency (Hz) derived from a Nyquist plot in a prediction method according to an embodiment of the present disclosure, and FIG. 3b is a diagram showing an example of a relation graph of an imaginary capacitance (F/cm$^2$) for each frequency (Hz) derived from the Nyquist plot.

FIG. 4 is a diagram showing a comparison of the graph of the calculation result of the amount of charge for each cycle (red) and the prediction expression graph of the capacity per cycle (blue) for a lithium secondary battery in a form of a blocking cell derived from the prediction method according to an embodiment of the disclosure, and the measured graph of the capacities for each cycle (black) for an actual lithium secondary battery in a form of a non-blocking cell.

DETAILED DESCRIPTION OF THE EMBODIMENTS

Hereinafter, preferred embodiments are described to help the understanding of the present disclosure. However, the following examples are for illustrative purposes only and the present disclosure is not intended thereby.

Preparation Example: Preparation of Lithium Secondary Battery in a Form of a Non-Blocking Cell and a Blocking Cell First, a lithium secondary battery in the form of a non-blocking cell was prepared by the following method.

$LiNi_{0.6}Co_{0.1}Mn_{0.1}O_2$ was used as a cathode active material. 90 wt % of this $LiNi_{0.6}Co_{0.1}Mn_{0.1}O_2$ cathode active material, 5 wt % of Super C65 conductive material and 5 wt % of PVdF as a binder was added to NMP as a solvent, and mixed to prepare a cathode slurry. The cathode slurry was applied to an aluminum foil having a thickness of 20 µm, and then rolled and dried to produce an active material layer and a cathode.

Meanwhile, 1 mm lithium metal was used as the anode active material.

The anode and cathode respectively produced above were cut, a porous polyethylene separator was interposed between the cathode and the anode, and then an electrolyte solution in which 1M of $LiPF_6$ was dissolved in a mixed solvent of EC:DEC=1:1 (volume ratio) was injected to produce a lithium secondary battery in a form of a non-blocking cell. For such a lithium secondary battery in a form of a non-blocking cell, a total of 75 cycles of electrochemical reaction (charge/discharge) proceeded at voltage range of 3.0 to 4.2V under the conditions of charge CC (0.5 C), CV (0.05 C) and discharge CC (0.5 C), CV (0.05 C).

In the process of proceeding the electrochemical reaction of the 75 cycles, the electrochemical reactions for each cycle of 10, 20, 30, 40, 50, 60, and 70 cycles were performed, and then the lithium secondary battery in a form of a non-blocking cell was completely discharged to control the SOC to 0%. Then, the lithium secondary battery in a form of a non-blocking cell was disassembled, two identical cathodes were faced each other instead of the anodes, the same separator was interposed therebetween, the same electrolyte solution was injected to produce a lithium secondary battery in a form of a blocking cell corresponding to each cycle.

Example: Derivation of a Prediction Expression of Capacity for Each Cycle of a Lithium Secondary Battery and Evaluation of its Reliability In the Preparation Example, after the electrochemical reaction of 10, 20, 30, 40, 50, 60 and 70 cycles, impedance spectroscopic analysis was performed for the lithium secondary batteries in the form of blocking cells respectively manufactured by the following method.

This analysis was performed using impedance spectroscopy device (manufacturer: Biologic; product name: SP-300), and proceeded under the application of an AC signal having an amplitude of 10 mV and a frequency of 106 to 10-4 Hz.

From these impedance spectroscopic analysis results, a Nyquist plot for a battery in the form of a blocking cell for each cycle of Preparation Example was derived, which was shown in FIG. 2. Then, the real impedance ($\Omega * cm^2$), imaginary impedance ($\Omega * cm^2$), and complex impedance ($\Omega * cm^2$) for each frequency (Hz) were derived from the Nyquist plot, respectively, which were then substituted into the following Equation 1, and real capacitance ($F/cm^2$) and imaginary capacitance ($F/cm^2$) for each frequency were derived, respectively.

$$C' = \frac{-Z''(\omega)}{\omega |Z(\omega)|^2} \quad C'' = \frac{-Z'(\omega)}{\omega |Z(\omega)|^2} \quad \text{[Equation 1]}$$

in the above Equation 1, C' represents the real capacitance ($F/cm^2$) of the lithium secondary battery, C'' represents the imaginary capacitance ($F/cm^2$), w represents the angular velocity defined as $2*\pi*$frequency, z'(w) represents the real impedance ($\Omega * cm^2$) for each angular velocity, z''(w) represents the imaginary impedance ($\Omega * cm^2$) for each angular velocity, and z(w) represents the total complex impedance ($\Omega * cm^2$) calculated from the real impedance and the imaginary impedance.

From the above derivation results, a relation graph of real and imaginary capacitances ($F/cm^2$) for each frequency (Hz) for the battery in a form of a blocking cell for each cycle was derived, and shown in FIGS. 3a and 3b, respectively. In addition, as shown in FIG. 3b, in the relation graph of the number of imaginary capacitances for each frequency, the baseline of the single distribution curve (red line in FIG. 3b) was set and then the area under the peak (A) of this single distribution curve was integrated, and substituted into the relation expression of area (A)=0.682*charge amount Co. Thereby, the charge amount ($F/cm^2$) for each cycle of the blocking cell type battery was calculated, respectively. The data of the charge amount for each cycle calculated and collected through this process is shown in the red graph of FIG. 4.

Separately from this, in the relation graph of the imaginary capacitance for each frequency, the frequency value of the x-axis corresponding to the peak point was taken as the reciprocal, the time constant and output data of the battery were separately calculated. In addition, the peak distribution ($\sigma$) data of the relation graph of capacitance for each frequency were calculated together.

Meanwhile, separately from the above process, the lithium secondary battery in a form of a non-blocking cell produced in Preparation Example was subjected to a charge/discharge process of 75 cycles. The capacity (mAh/g) for each cycle was measured, and shown as a black graph in FIG. 4.

Then, the charge amount data for each cycle for the battery in a form of a blocking cell and the capacity data for each cycle for the battery in a form of a non-blocking cell were made to correspond with each other. Thus, the prediction data for predicting the change pattern of capacity y for each x cycle were collected. Among these data, by linear regression of the predicted data of capacity y for each cycle x collected at 30 or more cycles, the prediction expression for capacity per cycle was derived. On the other hand, by using the peak distribution ($\sigma$) data of the relation graph of the time constant of the battery and the capacitance for each frequency described above, artificial neural network learning was performed, which was fed back to correct the prediction expression for capacity for each cycle derived above.

Through the process described above, a graph (blue in FIG. 4; y=−1.40184x+64.2) of the final corrected capacity for each cycle was derived, respectively, and shown in FIG. 4. Comparing this with the actual graph of the capacity (mAh/g) for each cycle shown in the black graph of FIG. 4, it is confirmed that the prediction expression of the capacity for each cycle derived in Examples reflects the actual measurement results with very high reliability.

The invention claimed is:

1. A method for predicting lifespan characteristics of a lithium secondary battery, the method comprising:
   a first step of subjecting a lithium secondary battery in a form of a blocking cell to an impedance spectroscopic analysis under application of multiple frequencies;
   a second step of deriving a relationship between capacitance for each frequency from a result of the impedance spectroscopic analysis, and calculating a charge amount of the lithium secondary battery therefrom;
   a third step of repeatedly performing the first and second steps while repeatedly performing an electrochemical reaction for the lithium secondary battery for a number of cycles, to thereby collect charge amount data of the lithium secondary battery for each of the cycles; and
   a fourth step of measuring a capacity for each of the cycles for a lithium secondary battery in a form of a non-blocking cell, and allowing the capacity to correspond to the charge amount data for each of the cycles collected in the third step, to thereby derive a prediction expression of the capacity for each of the cycle of the lithium secondary battery.

2. The method for predicting lifespan characteristics of a lithium secondary battery according to claim 1, wherein
   the lithium secondary battery in the form of the blocking cell includes an electrode, a separator, and an electrolyte facing each other, and
   the facing electrode includes an electrode of the same polarity or a pristine electrode, or the electrolyte includes a non-intercalation salt.

3. The method for predicting lifespan characteristics of a lithium secondary battery according to claim 1, wherein the impedance spectroscopic analysis of the first step is performed under the application of a frequency of $10^6$ to $10^{-4}$ Hz.

4. The method for predicting lifespan characteristics of a lithium secondary battery according to claim 1, wherein as a given result of the impedance spectroscopic analysis, data of the given result including a Nyquist plot of the lithium secondary battery, real capacitance data, imaginary capacitance data, time constant data, a capacitance relation graph for each frequency, and peak distribution data of the capacitance relation graph for each frequency are derived.

5. The method for predicting lifespan characteristics of a lithium secondary battery according to claim 4, wherein the second step comprises,
   deriving a relation graph of an imaginary capacitance for each frequency of the lithium secondary battery; and
   calculating the charge amount of the lithium secondary battery from an integral value of the relation graph.

6. The method for predicting lifespan characteristics of a lithium secondary battery according to claim 5, wherein the step of deriving the relation graph of the imaginary capacitance for each frequency comprises;
   deriving a Nyquist plot of the lithium secondary battery from the result of the impedance spectroscopic analysis; and
   substituting a real impedance, an imaginary impedance and a complex impedance for each frequency derived from the Nyquist plot into the following Equation 1, and deriving a real capacitance and an imaginary capacitance for each frequency, respectively:

$$C' = \frac{-Z''(\omega)}{\omega |Z(\omega)|^2} \quad C'' = \frac{-Z'(\omega)}{\omega |Z(\omega)|^2} \qquad \text{[Equation 1]}$$

in the above Equation 1, C' represents the real capacitance of the lithium secondary battery, C" represents the imaginary capacitance, w represents an angular velocity defined as 2*π*frequency, z'(w) represents the real impedance for each angular velocity, z"(w) represents the imaginary impedance for each angular velocity, and z(w) represents the total complex impedance calculated from the real impedance and the imaginary impedance.

7. The method for predicting lifespan characteristics of a lithium secondary battery according to claim 1, wherein the prediction expression of the capacity for each of the cycles in the fourth step is derived from a relational expression of the capacity for each of the cycles after 30 or more cycles of electrochemical reactions are performed for the lithium secondary battery.

8. The method for predicting lifespan characteristics of a lithium secondary battery according to claim 1, further comprising a fifth step of correcting the prediction expression of the fourth step by performing artificial neural network learning based on the result of the impedance spectroscopic analysis.

9. The method for predicting lifespan characteristics of a lithium secondary battery according to claim 8, wherein the allowing step of the fourth step and the artificial neural network learning step of the fifth step are performed simultaneously or within the same system, so that the prediction expression of the capacity for each of the cycles of the lithium secondary battery is derived.

10. The method for predicting lifespan characteristics of a lithium secondary battery according to claim 8, wherein:
    as a given result of the impedance spectroscopic analysis, data of the given result including a Nyquist plot of the lithium secondary battery, real capacitance data, imaginary capacitance data, time constant data, capacitance relation graph for each frequency, and peak distribution data of the capacitance relation graph for each frequency are derived; and
    in the fifth step, the artificial neural network learning is performed based on the data including the real capacitance data, the imaginary capacitance data, the time constant data, and the peak distribution data of the capacitance relation graph for each frequency derived from the given result of the impedance spectroscopic analysis.

11. The method for predicting lifespan characteristics of a lithium secondary battery according to claim 8, further comprising a sixth step of predicting capacity characteristics for each of the cycles of the lithium secondary battery to be measured, based on the prediction expression of the fourth step or the corrected prediction expression of the fifth step.

12. A system for predicting lifespan characteristics of a lithium secondary battery, the system comprising:
    a first measurement unit including an impedance spectroscopic analysis device;
    a second measurement unit that is configured to measure a capacity for each cycle while subjecting a lithium secondary battery in a form of a non-block cell to an electrochemical reaction;
    a data processing unit that is configured to calculate a charge amount and a charge amount for each cycle from an impedance spectroscopic analysis result data of the lithium secondary battery in a form of a blocking cell derived from the first measurement unit; and
    a calculation unit that is configured to derive a prediction expression of the capacity for each cycle of a lithium secondary battery, from the capacity for each cycle of the lithium secondary battery in the form of the non-blocking cell that is measured by the second measurement unit and the charge amount for each cycle of the lithium secondary battery in the form of the blocking cell that is calculated by the data processing unit.

13. The system for predicting lifespan characteristics of a lithium secondary battery according to claim 12, wherein the data processing unit is configured to calculate the charge amount for each cycle, from a relation data of an imaginary capacitance for each frequency included in the impedance spectroscopic analysis result data.

14. The system for predicting lifespan characteristics of a lithium secondary battery according to claim 12, further comprising an artificial neural network learning unit configured to perform artificial neural network learning based on the impedance spectroscopic analysis result data that is inputted from the first measurement unit, and to correct the prediction expression of the capacity for each cycle derived from the calculation unit.

* * * * *